(12) United States Patent
Andreou et al.

(10) Patent No.: US 10,270,839 B2
(45) Date of Patent: Apr. 23, 2019

(54) CONTENT COLLECTION NAVIGATION AND AUTOFORWARDING

(71) Applicant: Snap Inc., Santa Monica, CA (US)

(72) Inventors: Jacob Andreou, Santa Monica, CA (US); Darryl Hudgin, Marina Del Rey, CA (US); Evan Spiegel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 72 days.

(21) Appl. No.: 15/083,976

(22) Filed: Mar. 29, 2016

(65) Prior Publication Data

US 2017/0289234 A1    Oct. 5, 2017

(51) Int. Cl.
*H04L 29/08* (2006.01)
*G06F 3/0484* (2013.01)
(Continued)

(52) U.S. Cl.
CPC .......... *H04L 67/06* (2013.01); *G06F 3/04845* (2013.01); *G06F 3/04883* (2013.01);
(Continued)

(58) Field of Classification Search
CPC ............... H04L 67/06; G06F 17/30035; G06F 17/30525; G06F 17/30017; G06F 17/30126; G06F 17/30864
(Continued)

(56) References Cited

U.S. PATENT DOCUMENTS 6,038,295 A    3/2000 Mattes
6,980,909 B2   12/2005 Root et al.
(Continued)

FOREIGN PATENT DOCUMENTS

CA    2887596 A1    7/2015
WO    WO-2014168722 A1    10/2014

OTHER PUBLICATIONS

Garaventi JH, Chebot AB, inventors; Cadence Media, Inc., assignee. Sponsored content creation and distribution. U.S. Appl. No. 12/037,594, filed Feb. 26, 2008.*

(Continued)

*Primary Examiner* — Ranodhi Serrao
*Assistant Examiner* — James N Fiorillo
(74) *Attorney, Agent, or Firm* — Schwegman Lundberg & Woessner, P.A.

(57) ABSTRACT

Systems and methods for communicating and displaying collections of image and video clip content are described. In one example embodiment, a device receives interface information about a group of content collections from a server computer system. When a user inputs a selection of a first content collection, the device displays images and video clips in a sequence defined by the content collection. Each piece of content (e.g. image or video clip) is displayed for less than a threshold display time. When the device finishes playing the first content collection, the device automatically begins playing a next content collection. Additional content collections generated from content submitted by other client devices can be received from the server computer system, with autoforward play of additional content collections continuing indefinitely. Some embodiments include content collections generated by the server computer system, as well as advertising elements or other system images presented between content collections.

17 Claims, 14 Drawing Sheets

(51) Int. Cl.
*G06F 3/0488* (2013.01)
*H04L 12/58* (2006.01)
*G06F 17/30* (2006.01)

(52) U.S. Cl.
CPC .. *G06F 17/30244* (2013.01); *G06F 17/30781* (2013.01); *H04L 51/02* (2013.01); *H04L 51/10* (2013.01); *H04L 67/36* (2013.01)

(58) Field of Classification Search
USPC ........ 709/201, 204, 217, 220, 247, 201.204, 709/201.203
See application file for complete search history.

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 7,577,678 | B2* | 8/2009 | Wang ............... G06F 17/30017 |
| 8,131,597 | B2 | 3/2012 | Hudetz et al. |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,467,723 | B2* | 10/2016 | Osminer ............. H04N 21/251 |
| 9,489,661 | B2 | 11/2016 | Evans et al. |
| 9,491,134 | B2 | 11/2016 | Rosen et al. |
| 2004/0093432 | A1* | 5/2004 | Luo ....................... G06T 3/4092 709/247 |
| 2006/0041589 | A1* | 2/2006 | Helfman ............. G06F 17/3089 |
| 2008/0201225 | A1* | 8/2008 | Maharajh .......... G06F 17/30035 705/14.43 |
| 2009/0089352 | A1* | 4/2009 | Davis ..................... G06Q 10/00 709/201 |
| 2011/0202598 | A1 | 8/2011 | Evans et al. |
| 2012/0144003 | A1* | 6/2012 | Rosenbaum ...... G06F 17/30864 709/220 |
| 2012/0159403 | A1* | 6/2012 | Capan ............... G06F 17/30017 715/863 |
| 2012/0209924 | A1 | 8/2012 | Evans et al. |
| 2013/0238649 | A1* | 9/2013 | Shum ................ G06F 17/30292 707/758 |
| 2013/0304818 | A1* | 11/2013 | Brumleve ............. H04L 67/02 709/204 |
| 2014/0040371 | A1* | 2/2014 | Gurevich ............. H04W 4/21 709/204 |
| 2014/0149501 | A1* | 5/2014 | Kao .................. G06Q 30/0261 709/204 |
| 2014/0223099 | A1* | 8/2014 | Kidron ................ G06F 12/0806 711/118 |
| 2014/0282096 | A1* | 9/2014 | Rubinstein ............ H04L 65/403 715/753 |
| 2014/0289364 | A1* | 9/2014 | Kenna, III ............. G06Q 10/10 709/217 |
| 2014/0344334 | A1* | 11/2014 | Trachtenberg ..... H04N 21/4307 709/203 |
| 2015/0106444 | A1* | 4/2015 | Schneider ......... G06F 17/30772 709/204 |
| 2015/0185965 | A1* | 7/2015 | Belliveau ............. G11B 27/031 715/723 |
| 2015/0213001 | A1* | 7/2015 | Levy .................... G06F 17/3005 715/202 |
| 2015/0244794 | A1* | 8/2015 | Poletto ................ H04L 67/1085 715/748 |
| 2015/0365795 | A1* | 12/2015 | Allen .................... H04W 4/029 455/457 |
| 2015/0381522 | A1* | 12/2015 | Cai ........................ H04L 47/803 370/389 |
| 2016/0034437 | A1* | 2/2016 | Yong .................. G06Q 30/0241 715/202 |
| 2017/0083586 | A1* | 3/2017 | Huang .............. G06F 17/30528 |
| 2017/0103783 | A1* | 4/2017 | Paglia ................. G11B 27/031 |
| 2017/0123982 | A1* | 5/2017 | Haven .................. G06F 17/3028 |
| 2017/0161292 | A1* | 6/2017 | Sever ................ G06F 17/30126 |
| 2017/0193548 | A1* | 7/2017 | Pacella .............. G06Q 30/0257 |
| 2017/0212892 | A1* | 7/2017 | McIntosh ................ G06N 7/005 |
| 2017/0228761 | A1* | 8/2017 | Goel ........................ G06Q 30/02 |
| 2017/0243266 | A1* | 8/2017 | Trachtenberg ..... H04N 21/4307 |
| 2017/0255681 | A1* | 9/2017 | Giunio-Zorkin ............................ G06F 17/30525 |

OTHER PUBLICATIONS

Shamma DA, Kennedy L, Churchill EF. Watching and talking: media content as social nexus. InProceedings of the 2nd ACM International Conference on Multimedia Retrieval Jun. 5, 2012 (p. 12). ACM.*

Shamma DA, Shaw R, Shafton PL, Liu Y. Watch what I watch: using community activity to understand content. InProceedings of the international workshop on Workshop on multimedia information retrieval Sep. 24, 2007 (pp. 275-284). ACM. (Year: 2007).*

Shamma DA, Kennedy L, Churchill EF. Watching and talking: media content as social nexus. InProceedings of the 2nd ACM International Conference on Multimedia Retrieval Jun. 5, 2012 (p. 12). ACM. (Year: 2012).*

"International Application Serial No. PCT/US2017/024805, International Search Report dated Jun. 28, 2017", 3 pgs.

"International Application Serial No. PCT/US2017/024805, Written Opinion dated Jun. 28, 2017", 5 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"International Application Serial No. PCT/US2017/024805, International Preliminary Report on Patentability dated Oct. 11, 2018", 7 pgs.

* cited by examiner

CONTENT COLLECTION NAVIGATION AND AUTOFORWARDING

BACKGROUND

Content such as news stories or other collections of live or recent content have traditionally been presented to consumers in a heavily controlled and curated format. Early formats for news presentation included newspapers and magazines. Later formats included broadcast radio and television news. Traditional media and news sources for time sensitive content are typically heavily associated with corporations or well-known persons that gather and present information about current events and happenings. In the modern Internet era, many such news sources have fragmented, but core aspects of information gathering and presentation often remain associated with professionals gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
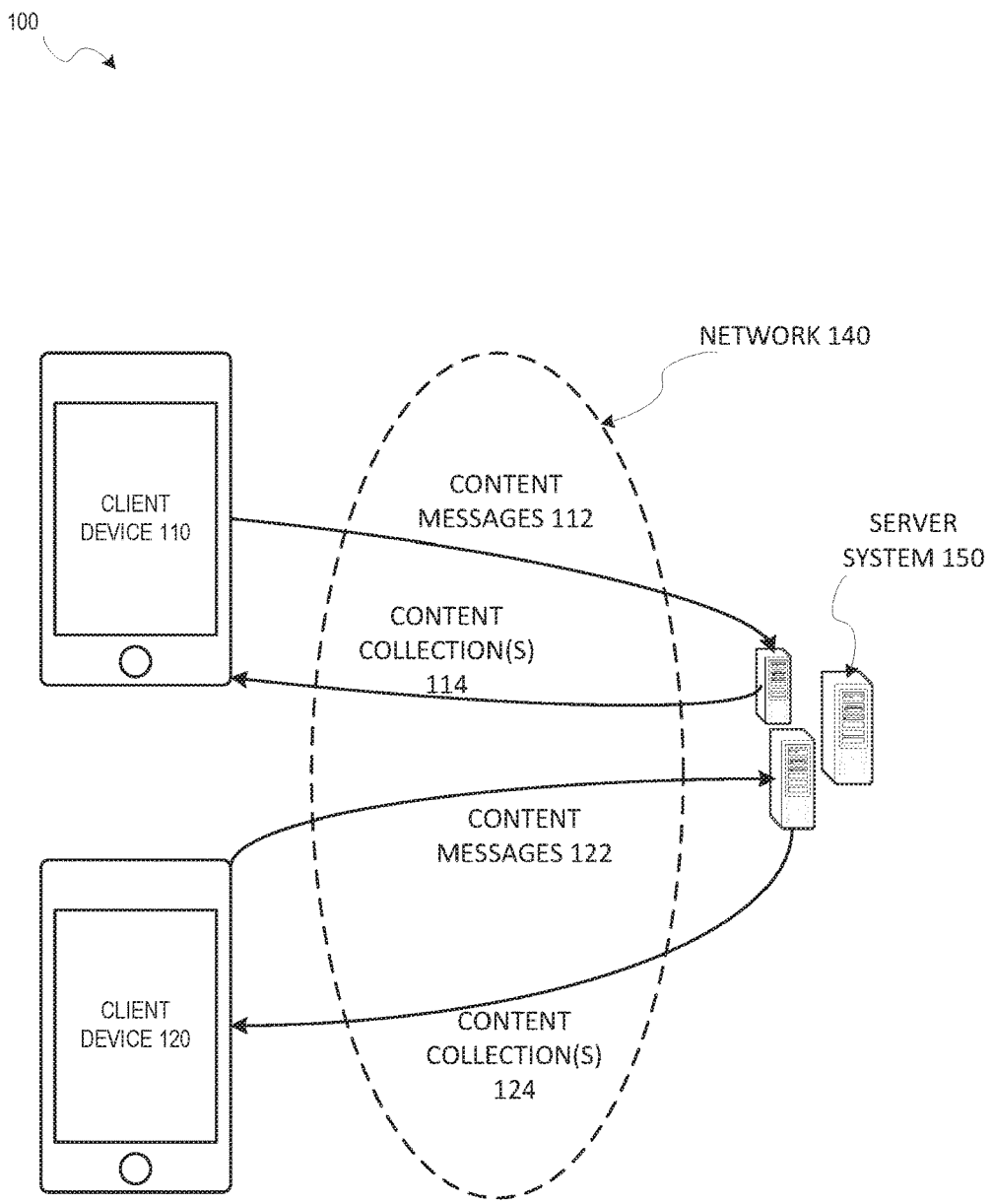
FIG. 1 is a block diagram illustrating a networked system that may be used to implement some example embodiments.

Systems and methods described herein relate to automated presentation of content collections, including processes for generating, selecting, and continuously presenting collections of content to a user.

"Content", as described herein, refers to one or more images or video clips captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g. transformations, filters, added text, etcetera.) Individual pieces of content may have multimedia elements, including drawings, text, animations, emoji, or other such elements added along with image or video clip elements. Content captured by an image sensor of client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less, and may allow users to select display times less than 10 seconds for image content.

A "content message" as referred to herein refers to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g. stories.) In various systems, content messages may be sent from one individual user to another individual user, as, for example, an ephemeral message in addition to the ability to send content messages to a server computer system for inclusion in various content collections.

A "content collection" as described herein is an ordered set of content. The individual pieces of content that make up a particular content collection may be related in a variety of different ways. For example, in some embodiments, a content collection includes all pieces of content marked as public that are sent to a server system from a particular user within a certain time frame (e.g. within the past 24 hours.) Access to such a content collection can be limited to certain other users (e.g. friends) identified by the user that generates the content for the collection. In some other embodiments, content collections include pieces of content from different users that are related by time, location, content, or other metadata. In some embodiments, content collections are referred to as stories. A story or content collection may be generated from pieces of content that are related in a variety of different ways, as is described in more detail throughout this document.

For example, two user devices may each be associated with accounts, and the accounts may be identified as connected in a communication system. Throughout a given day, one user captures images or video clips (e.g. pieces of content) and sends a content message for each piece of content to the communication system. Some of these pieces of content are identified for inclusion in a semi-private content collection associated with the sending device. Some of the pieces of content are identified as available for public content collections.

Because the two users are connected, the second user is able to access the semi-private content collection associated with the first user account, which contains only pieces of content generated by devices of the first user. When a device of the second user connects to the communication system, the second user's device receives interface information indicating that the first user has a content collection with updated pieces of content. The interface information sent to the second user's device also includes indications for other user's content collections that have been updated, so long as the second user is associated with or otherwise authorized to view the content collections. Additionally, the interface information may include details for content collections that are created from content messages sent from any other system user. These live or location based content collections may be curated or automatically generated by the communication system.

When the second user selects any one of the content collections described in the interface information, the second user's device begins to display each piece of content from the selected collection in order. Each piece of content is associated with a display time less than a threshold (e.g. 10 seconds or less). When the device reaches the end of the selected content collection, rather than stopping display of content, the device autoforwards to a next content collection. The communication system can determine which content collection to play next in a variety of different ways. In some embodiments, content collections are selected first from associated user content collections having a most recent unseen update. After all content collections from such friend accounts are displayed, public content collections may be selected based on proximity, time, interestingness, or other such metrics. In other embodiments, other user selections or preferences may be used to select a next content collection.

In some embodiments, the communication system receives sufficient content from enough users that the system may generate and display content collections indefinitely. Additionally, some systems may allow automatic insertion of advertising elements between some or all content collections. Further still, some systems allow a user to jump to a next or previous piece of content or a next or previous content collection in addition to displaying pieces of content and content collections in a progressive manner that automatically proceeds to the next piece of content and then the next content collection over time. Additional embodiments and details are described below.

FIG. 1 is a block diagram illustrating a networked system 100, according to some example embodiments. System 100 includes client device 110, client device 120, server system 150, and network 140 that is used to convey communications between client devices 110 and 120 and the server system 150. Client devices 110 and 120 may be any smartphone, tablet, phablet, laptop computer, network-enabled camera, or any other such network enabled device. Client devices 110, 120 may include a camera device for capturing content, or may be coupled to a separate camera device that is used to capture the content prior to sending to other client device 110, 120 for storage. Some embodiments may therefore include wearable devices such as a pendant with an integrated camera that is coupled to a client device 110, 120. Other embodiments may include other associated devices with an integrated camera that may be wearable such as a watch, eyeglasses, clothing such as a hat or jacket with integrated electronics, a clip-on electronic device, or any other such devices that may communicate or be integrated with a client device 110, 120. Client devices 110 and 120 are connected to server system 150 via network 140. The network 140 may include any combination of wired and wireless connections. This may include cellular access networks, access point interfaces to the internet, or any other such networks 140 or network elements. For example, client device 110 may interface with network 140 using a Long Term Evolution (LTE) cellular network to communicate with server system 150, while client device 120 may use a Wi-Fi access point to interface with network 140 and communicate with server system 150. Server system 150 may be one or more computing devices as part of a service or network computing system. In certain embodiments, particularly embodiments with large numbers of client devices 110, 120 interfacing with a server system 150 from widely different locations all over the globe, server system 150 may be a distributed network 140 of server computers that are similarly widely distributed, and which communicate with each other via network 140. In some embodiments, client devices 110 and 120, as well as any elements of server system 150 and network 140, may be implemented using elements of software architecture 702 or machine 1000 described in FIGS. 9 and 10.

Networked system 100 then may be used in communication of content messages from client devices 110, 120 to a system 150, and communication of content collections from the system 150 to the client devices 110, 120. As shown in FIG. 1, client device 110 communicates content message 112 to server system 150, and client device 110 receives content collections 114 from server system 150. In addition to this functionality, used for the embodiments described herein, client device 110 may additionally receive private pieces of content and communications from other users, and may convey a personal content collection to server system 150, with the personal content collection including images and or video from content messages 112 generated by client device 110 or another device coupled to client device 110. Similarly, client device 120 sends content messages 122 and receives content collections 124, and may additionally perform other actions.

Figure 2A:
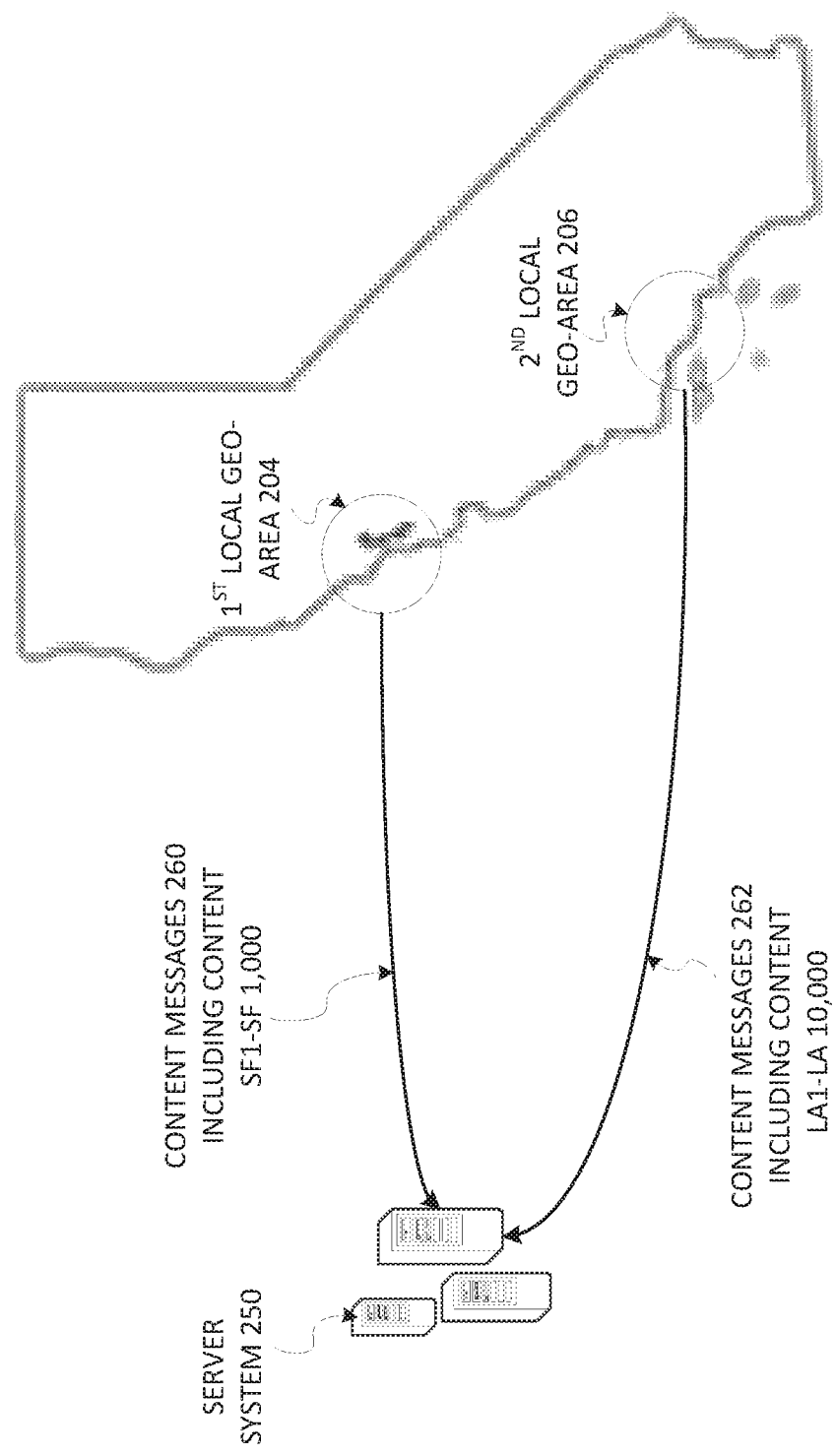
FIG. 2A illustrates aspects of server system operation receiving content for different geographic areas, in accordance with certain example embodiments.
Figure 2B:
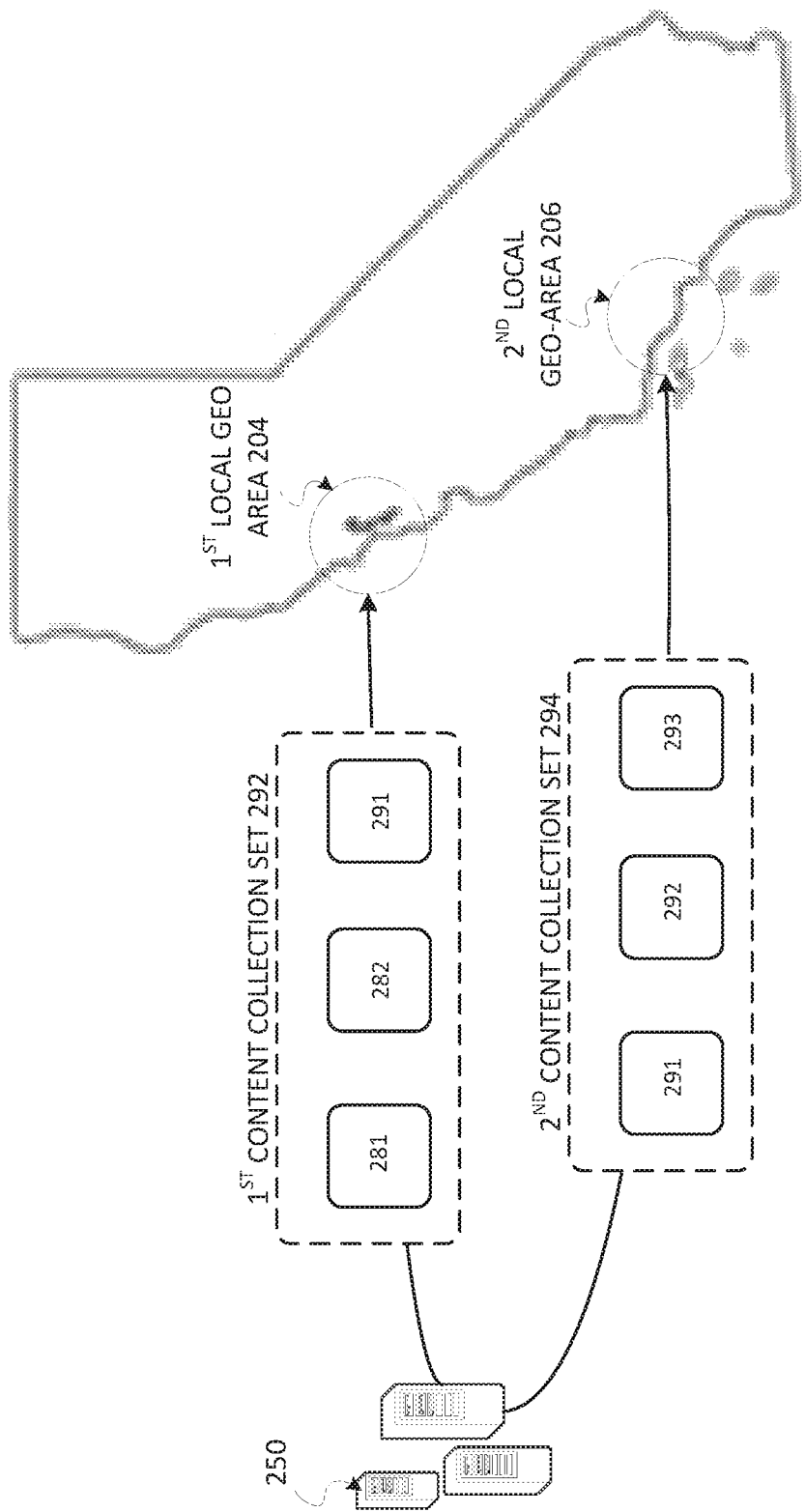
FIG. 2B illustrates aspects of server system operation distributing different content collection in accordance with certain example embodiments.

FIG. 2A illustrates aspects of server system 250 receiving content messages from different geographic areas in accordance with certain example embodiments. FIG. 2B illustrates aspects of server system 250 sending different live content collections to different geographic areas in accordance with certain example embodiments. In contrast to FIG. 1 that shows two client devices 110 and 120, FIGS. 2A-D show an abstract of the client side of a system where thousands or millions of client devices 110, 120 in different areas may be interacting with a server system 250.

Instead of individual client devices 110, 120, FIGS. 2A and 2B show a simple user segment representation with two local geographic areas 204 and 206, which are the lowest tier areas in this example. In certain embodiments, geofences are used to define local areas. Such geofences may be tracked by aspects of a network system 100 including location systems within client devices such as client devices 110 and 120, network based location systems as part of network 140, separate location systems such as global positioning systems (GPS), or any combination of these or other location systems. In various embodiments, the live or public content collections (e.g. $1^{st}$ content collection set 292 or $2^{nd}$ content collection set 294) may be made available to a particular device based on the location of the device and a location associated with a particular content collection.

Figure 3A:
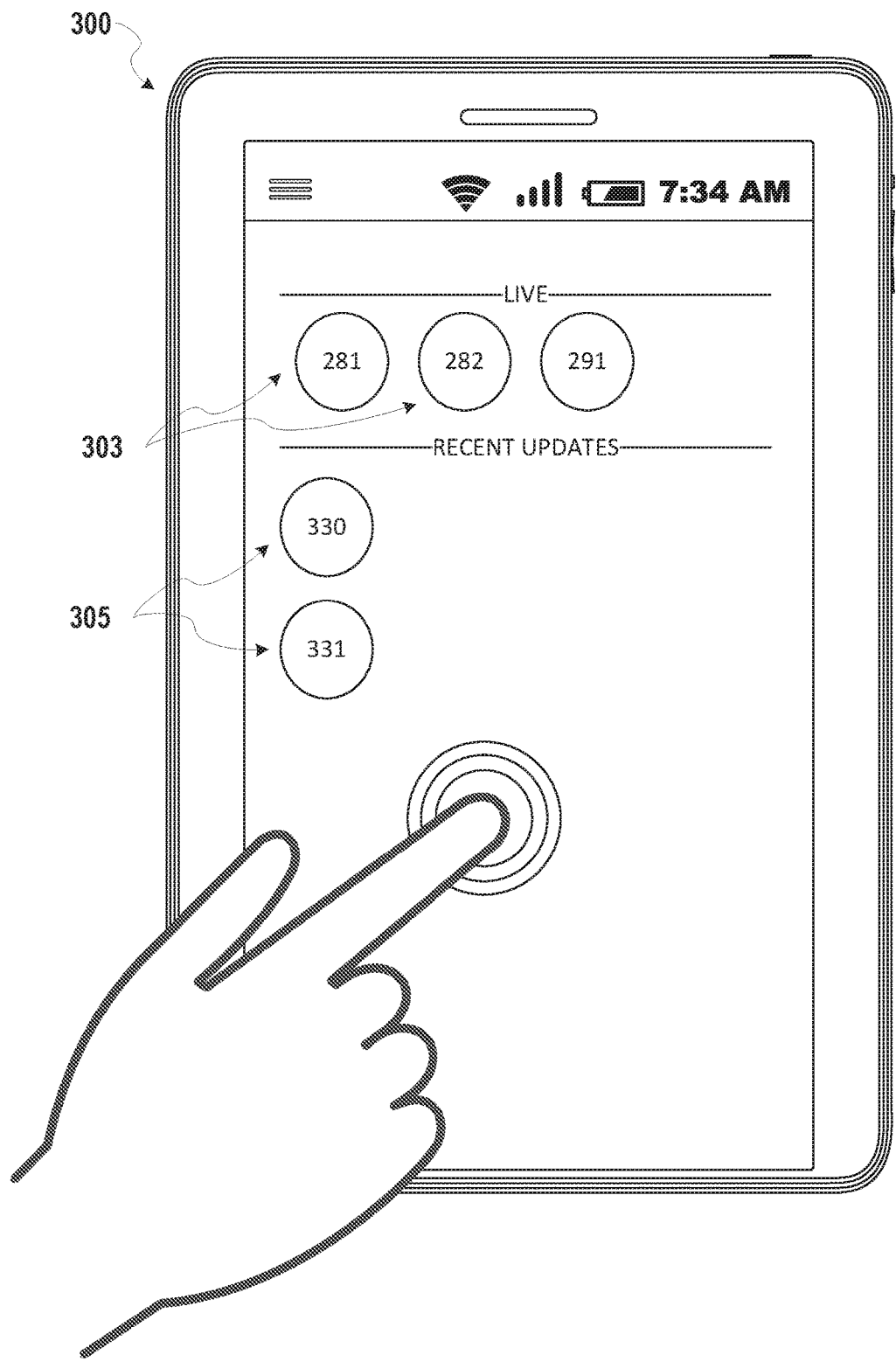
FIG. 3A illustrates an example user interface for presenting content collections on a mobile device in accordance with some example embodiments.

In other embodiments, rather than considering set geofences or groups of users, a system may generate content collections for each client device 110, 120 individually. In such an embodiment, whenever a user navigates to a content collections interface within an application operating on a client device 110, 120 (e.g. as illustrated in FIG. 3A), the client device 110, 120 communicates a current location to the server system 250. The location of the device or other device which provided information at that time can be used to generate a list of content collections for the device.

In the illustrated example of FIG. 2A, the client devices 110, 120 within first local geographic area 204 are grouped together and communicate 1000 content messages 260 to server system 250 in a first time period. The content associated with these content messages 260 is shown as SF1 through SF1000. During the same time period, 10000 content messages 262 containing individual video clips or images are sent to server system 250 by client devices 110, 120 within the second local geographic area 206, illustrated as content LA1 through LA10000. These are public content communications with content available for communication to any user. The system may additionally include content for content collections limited to "friend" accounts, as well as content sent as a message to a particular user that is to be deleted as an ephemeral message and not shared with any other user than a target recipient. The above volume of public content is sufficient to overwhelm an individual user. Therefore, server system 250 operates as a curator to filter the content messages 260, 262 and provide a select set of the pictures and videos from the content messages 260, 262 as one or more content collections.

In various embodiments as described below, this curation may be performed by system operators using a curation tool, or may be performed by automatic analysis and selection performed by the communication system. One example embodiment segments users by local area. Content collections for a client device 110, 120 are generated from the most recent content messages 260, 262 that were generated in the client device 110, 120's current local area. Such local content messages 260, 262 for a content collection can further be filtered based on image quality and image content. Image content may be used to prevent excess content duplication, to provide a variety of different content, to provide content identified as newsworthy (e.g. images associated with famous people), or based on any other such content filtering selections. Image content may also be analyzed to identify content duplication, and to avoid placing extremely similar content (e.g. videos of the same event from similar angles) in a single content collection. Additionally, the server system 250 can analyze trends associated with incoming content messages 260, 262 from other local areas to generate content collections based on the trends identified by the system. Additional details related to curation and content collection generation are discussed below with respect to FIG. 5.

FIG. 2B then illustrates a first content collection set 292 being made available to all client devices 110, 120 within the first local geographic area 204. Similarly, second content collection set 294 includes content collections visible to all client devices 110, 120 within the second local geographic area 206. Second content collection set 294 is shown as including three content collections, with all three content collections generated from content messages 260, 262 originating in the second local geographic area 206. These content collections of the second content collection set 294 include LA content collections 291-293. First content collection set 292 is shown as including two content collections generated from content messages 260, 262 originating within local geographic area 204, SF content collection 281 and SF content collection 282. First content collection set 292 also includes a content collection generated from content messages 260, 262 originating within local geographic area 206, LA content collection 291. As described above, LA content collection 291 may be identified by server system 250 analyzing system trends, where a larger than normal number of content collection views, screenshots, incoming additional content messages 260, 262, or other system trends identify LA content collection 291 as a content collection to be made visible to a larger user segment.

FIG. 3A illustrates an embodiment of a user interface for a client device 300. Client device 300 shows user selectable interface areas for each content collection. This includes selectable public live content collections in section 303 and semi-private content collections from friend accounts in section 305. The content collections in section 305 may thus each include content from devices associated with a single other account. The content in these content collections 330, 331 may include content within a recent time frame, such as the past 24 hours or one week, or may simply include previously unseen content. In other embodiments, the content may be limited for this account based "my stories" or account based content collections in any other way described herein. In the example of FIG. 3A, the client device 300 is associated with two other accounts having semi-private content collections 330 and 331 with unseen recent updates, and client device 300 is in the first local geo area 204 and thus has access to content collections in first content collection set 292, including content collection 281, content collection 282, and content collection 291. Additional content collections may be provided by scrolling left and right or up and down. Each interface area may provide basic details or sample images associated with each content collection. These details are received at client device 300 as interface information for available content collections. In certain embodiments, a content collection or part of a content collection may be provided to client device 300 prior to a selection of an interface area. In other embodiments, images of a content collection are communicated from a server system such as server system 250 following selection of a particular interface area.

The user may physically touch the client device 300, and in response to the touch, the client device 300 may determine tactile data such as touch location, touch force, or gesture motion. In various example embodiments, the client device 300 displays a home screen operable to launch applications or otherwise manage various aspects of the client device 300 in a content viewing area 397. In some example embodiments, the home screen provides status information such as battery life, connectivity, or other hardware statuses. The user can activate user interface elements by touching an area occupied by a respective user interface element. In this manner, the user interacts with the applications of the client device 300, including applications that implement content collection display and autoforwarding as described herein.

In certain embodiments, content may be presented within the touch screen of client device 300 operating as a client device 110, 120, and a touch input may be used to initiate a communication to a server system 150 to request content collections and to autoforward through a continuing set of content collections, as described herein.

Many varieties of applications 910 (also referred to as "apps") can be executing on the machine 1000, such as native applications (e.g., applications programmed in Objective-C, Swift, or another suitable language running on IOS™, or applications 910 programmed in Java running on ANDROID™), mobile web applications (e.g., applications written in Hypertext Markup Language-5 (HTML5)), or hybrid applications (e.g., a native shell application that launches an HTML5 session). For example, the client device 300 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the client device 300 includes a social messaging app such as SNAPCHAT® that, consistent with some embodiments, allows users to send public content to a server system 250, and to receive content collections from the server system 250. Such a SNAPCHAT application may additionally enable exchange of private ephemeral image and/or video content messages in addition to communication of content messages 260, 262 for inclusion in stories and receipt of content in the form of content collections for display on client device 300.

Figure 3B:
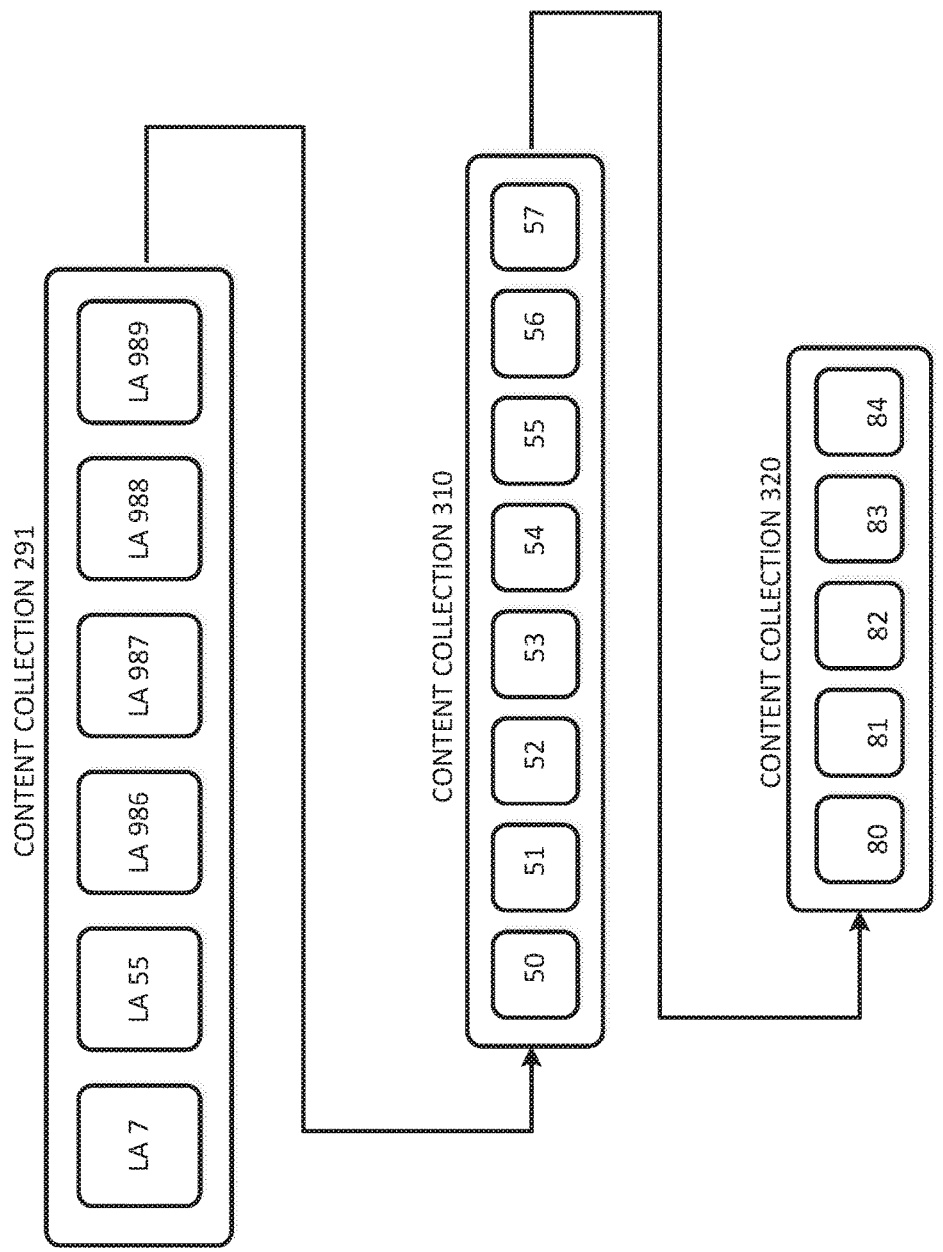
FIG. 3B illustrates aspects of autoforwarding of content collections, according to some example embodiments.
Figure 3C:
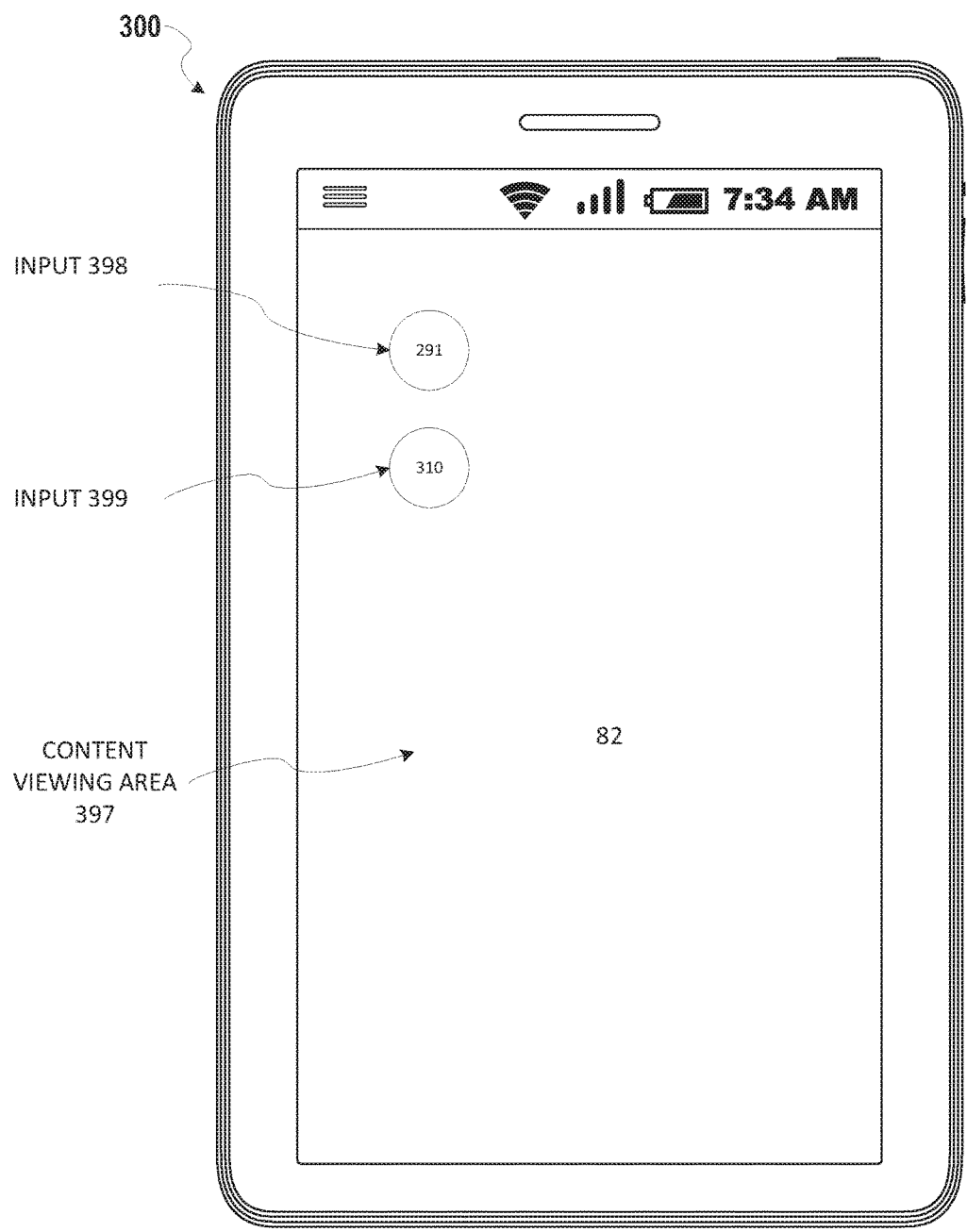
FIG. 3C illustrates aspects of content collection presentation and navigation on a mobile device, according to some example embodiments.
Figure 3D:
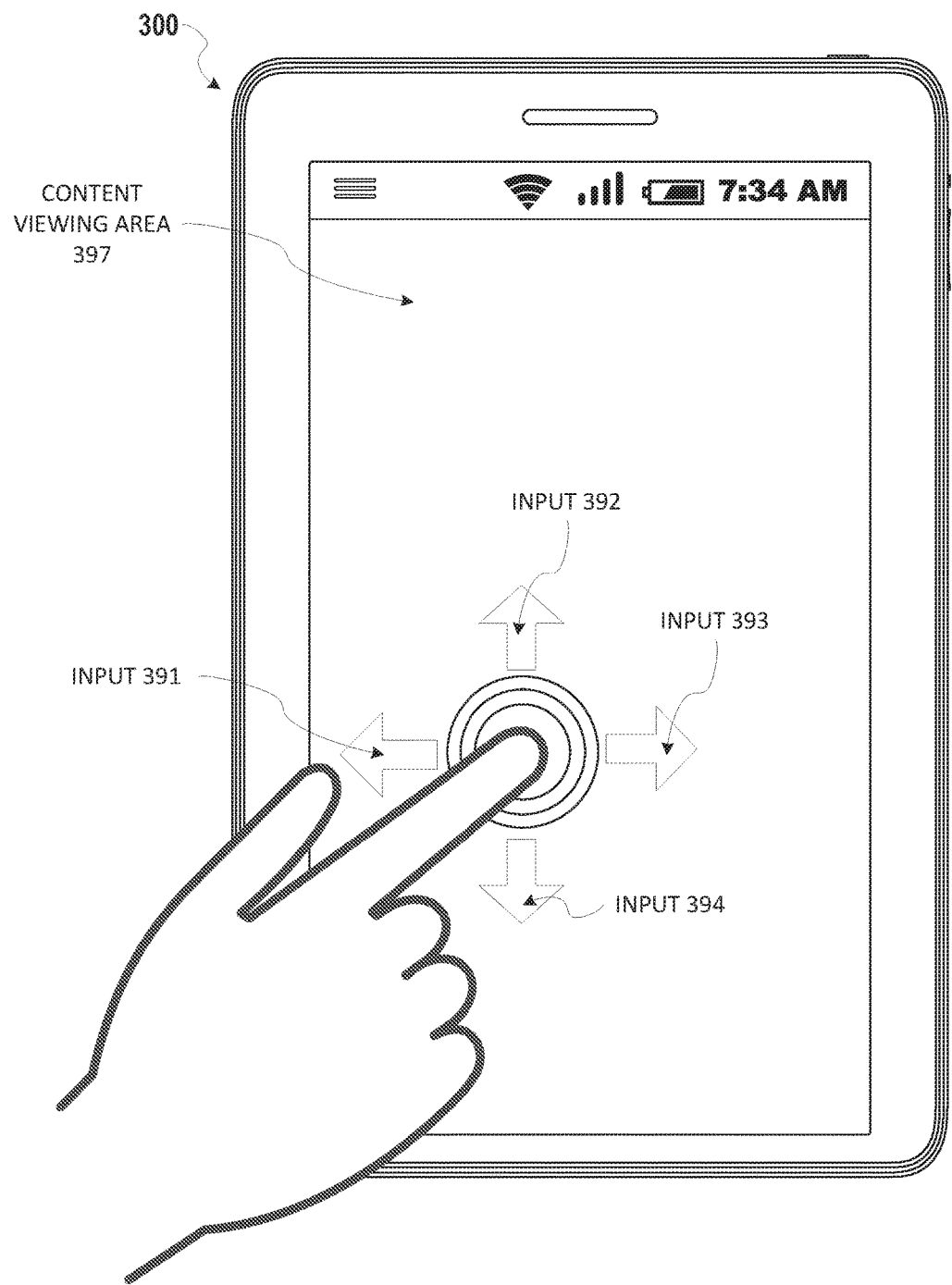
FIG. 3D illustrates aspects of content collection presentation and navigation on a mobile device, according to some example embodiments.

FIGS. 3C and 3D illustrate embodiments of an interface for viewing content collections such as the content collections shown in FIG. 3B after a touch selection for content collection 291 is made in an interface of client device 300. For example, as illustrated by FIG. 3B, when a user selects a portion of section 303 associated with content collection 291, the individual pieces of content within the collection, shown as pieces of content LA7, LA55, and LA 986-989 are displayed in order. Each piece of content has an associated display time that is below a display threshold time, and each piece of content is presented in order within content viewing area 397 for the associated display time for that piece of content. In the example of FIGS. 3A-B, the content collection 310 which has the most recent content updates is displayed at the top of the content collection list in section 305, and is the first automatically selected content collection after the content collection 291 selected by a user input finishes displaying. After content collection 291 finishes displaying, each piece of content 50-57 of content collection 310 plays in order, and the system automatically selects the next user based content collection 320 in the list. After content pieces 80-84 of content collection 320 are displayed, another content collection is selected by the system. If no other content collections presented for selection by a user are left, the client device 300 will receive a public content collection from the server computer system. This content collection can be a collection curated by system operators, or a content collection automatically generated from all content available to the server system 250. As display of a newly received content collection completes, the client device 300 continues receiving new content collections until the user inputs a command to stop presentation of new content.

In some embodiments, additional elements are inserted between the end of one content collection and the beginning of the next content collection. For example, and end-of-collection graphic is presented, in some embodiments, after content LA989 is displayed for the associated display time and before content 50 is displayed. In some embodiments, this element is an advertising element, which can include images, text, video, or multiple instances of any such element presented as an advertisement. In other embodiments, such advertising elements are presented between each story. In some embodiments, such advertising elements are presented between stories after a threshold time period, after a set number of content collections, or based on any combination of such elements. Multiple advertising elements or multiple sets of advertising elements may be presented between content collections on user devices as described herein. In some embodiments, "sponsored" content collections are content from an advertising account. These sponsored content collections may be periodically selected by a system based on advertising metrics within the system. Such sponsored content collections are, in some embodiments, selected in a fashion similar to the selection of advertising elements discussed above, and can include pieces of content from devices, as well as graphical, video, or image content generated using an advertising tool and submitted to a content database as sponsored content.

Thus, as described herein, a user accesses content collections via an interface of a mobile device. The interface may include information about the available content collections, and may order the content collections based on details of the content in the collections. For example, in one embodiment, a user may have an account associated with a number of other accounts (e.g. friends.) Each friend account may have an associated content collection that includes pieces of content sent to a server system 250. In one embodiment, a content collection for each friend account includes pieces of content selected for a personal story and sent to a server computer system within the past 24 hours, with older pieces of content removed from the content collection. Additionally, available content collections, in some embodiments, include content collections associated with public events or locations. Each of these content collections may be presented and ordered in a user interface on a user's mobile device. Further still, "live" content collections may be available, which present curated or automatically generated collections of content filtered from large numbers of content sent to a system.

In embodiments described herein, selection of an individual content collection from a set of presented content collections may then lead to a continuous and ongoing presentation of additional content collections or stories. This continuous presentation occurs as part of an autoforward operation on a mobile device which displays subsequent content collections after the initial content collection selected by a user has finished displaying.

For example, in one embodiment, a user may select an interface associated with a first content collection from a first friend. The example content collection can have six pieces of content which are each ten seconds long. After sixty seconds, assuming no further input from the user, the device will autoforward to another content collection. In some embodiments, the selection of a next content collection may be based on a source of the content collection. For example, some embodiments autoforward to the next content collection from a friend account based on which friend account has a story with the most recently added piece of content that has not been seen. After all content collections with previously unseen content have been displayed, content collections from local events may similarly be played automatically in order based on a most recent unseen update. After all local content collections with unseen pieces of content have been displayed, other collections of content are automatically displayed based on system settings. The content collections may be selected based on distance, time, interest, user preferences, or any other such system information. In a system that receives sufficient amounts of content messages 260, 262 which are available for stories, a mobile device can continue auto forwarding to present additional stories indefinitely, with time, location, quality, interestingness, or other filtering factors relaxed as needed to provide additional content collections.

Additionally, in some embodiments, an advertisement or other segmenting element may be displayed between some or all content collections. For example, in one embodiment, following display of the final piece of content for each content collection, a standard end-of-collection graphic may be displayed for a set period of time. In other embodiments, one or more advertisement images or video clips (e.g. advertisement elements) are displayed for a set period of time before autoforwarding to display of the next content collection. In some embodiments, both the end-of-collection graphic and advertisement elements are used.

As described above, then, a system can receive content messages 260, 262 from a wide variety of users, and use pieces of content from these messages to generate different types of content collections or stories. A user can access these stories via a device, and the system is able to autoforward through an ongoing sequence of content collections, with a next content collection selected in a variety of different ways.

In some embodiments, in addition to automatically presenting content collections for a pre-selected time, a user interface allows a user to navigate through pieces of content within a content collection and between different content collections. FIG. 3C shows content viewing area 397 along with input 398 and input 399, which are selectable areas on a touch screen of client device 300. In the interface illustrated by FIG. 3C, content viewing area 397 is displaying a piece of content 82 from content collection 320. Content collections 291 and 310 have been previously viewed. Input 398 provides a selectable interface to return to displaying the content of content collection 291, and input 399 provides a selectable interface to return to displaying the content of content collection 310. As the system autoforwards to presenting content from a next content collection, interface data for the previously viewed content collections can be moved to inputs 398, 399. In one embodiment, for example, after content collection 320 is finished, input 399 will show interface information for content collection 320, the interface information for content collection 310 will move to the area for input 398, and content collection 291 will no longer have a user selectable interface for jumping directly to the content of this content collection.

FIG. 3D shows another example embodiment of aspects of user inputs for navigating through content collections. In the embodiment of FIG. 3D, tapping on a right side of a touch screen display advances to a next piece of content before the content display period ends. Tapping on a left side of the display causes the piece of content displayed just prior to the piece of content being currently displayed to be displayed again. Such tapping may thus allow a user to navigate forward and backwards through individual pieces of content. Similarly, swiping from left to right as input 393 may move to the first piece of content of a content collection presented just prior to a current content collection, and swiping right to left as input 391 may cause the beginning of a next content collection to begin displaying. As a piece of content displays after a user navigation input, the display time for each piece of content is used to automatically advance between pieces of content, and then to a new content collection after a final piece of content is displayed. Swiping up as input 392 may return to the content collection selection interface of FIG. 3A, and swiping down as input 392 may provide a navigation interface to view similar pieces of content or receive additional details related to a current piece of content or element displayed within content viewing area 397.

Figure 4:
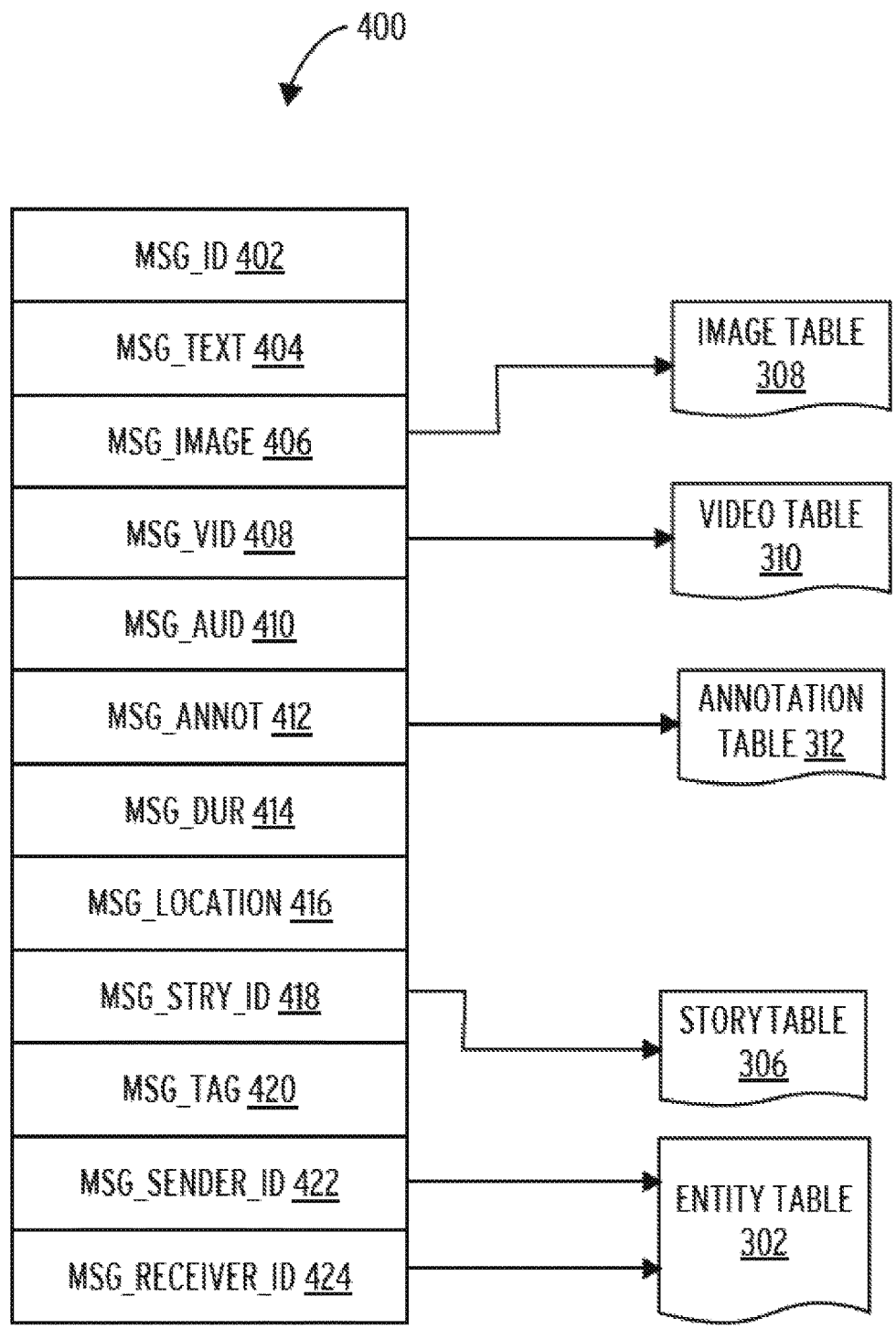
FIG. 4 illustrates aspects of a content message and associated content in accordance with some example embodiments.

FIG. 4 then describes one example of a content message 260, 262 that is used, in some embodiments, to send content to a server computer system from a client device 300, such as the communication of content messages 112 to server system 150 from client device 110. In some embodiments, the content of a particular message 400 is used to populate the message table stored within a database, accessible by the server computer system. Similarly, the content of a message 400 is stored in memory as "in-transit" or "in-flight" data of the client device 110 or the server computer system. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via a messaging client application operating on any device described herein.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition. Tag values may additionally be used to identify whether content from a message is to be included in a content collection associated with an account for the sending client device 110 with other content from that account. Tag values may also identify that content of a message is available for public dissemination, including inclusion in public content collections with content from devices associated with other accounts.

A message sender identifier 422: an identifier (e.g., a messaging system identifier, email address or device identifier) indicative of a user of the client device 110 on which the message 400 was generated and from which the message 400 was sent A message receiver identifier 424: an identifier (e.g., a messaging system identifier, email address or device identifier) indicative of a user of the client device 110 to which the message 400 is addressed.

The contents (e.g. values) of the various components of message 400 may be pointers to locations in tables within which content data values are stored. For example, an image value in the message image payload 406 may be a pointer to (or address of) a location within an image table. Similarly, values within the message video payload 408 may point to data stored within a video table, values stored within the message annotations 412 may point to data stored in an annotation table, values stored within the message story identifier 418 may point to data stored in content collection table, and values stored within the message sender identifier 422 and the message receiver identifier 424 may point to user records stored within an entity table. In some embodiments, the message receiver identifier 424 may be used to associate content of a message with a particular content collection or to make the content available for curated stories. For example, one message receiver identifier 424 may be associated with the user's personal content collection that is only available for viewing by friends. Another message receiver identifier 424 may be for a pool of content presented to a system curator that generates public content collections using submitted content messages 260, 262.

Data from such content messages 260, 262 as well as other sources (e.g. curation tools, advertisement tools, etc.) are, in some embodiments, stored in a database of a server computer system. While the content of the database is discussed as a number of tables, it will be appreciated that the data could be stored in other types of data structures (e.g., as an object-oriented database).

One example database includes message data stored within a message table. The entity table stores entity data, including an entity graph. Entities for which records are maintained within the entity table may include individuals, corporate entities, organizations, objects, places, events etc. Regardless of type, any entity regarding which the messaging server system 250 stores data may be a recognized entity. Each entity is provided with a unique identifier, as well as an entity type identifier.

The entity graph furthermore stores information regarding relationships and associations between entities. Such relationships may be social, professional (e.g., work at a common corporation or organization) interest-based or activity-based, merely for example. These relationships may, for example, provide access to semi-private content collections 330, 331, such that a user device is sent interface information for a content collection and allowed to select and view the associated content of another user if a relationship is established between the users.

The database, in some embodiments, also stores annotation data, in the example form of filters, in an annotation table. Filters for which data is stored within the annotation table are associated with and applied to videos (for which data is stored in a video table) and/or images (for which data is stored in an image table). Filters, in one example, are overlays that are displayed as overlaid on an image or video during presentation to a recipient user. Filters may be of varies types, including a user-selected filters from a gallery of filters presented to a sending user by the messaging client application when the sending user is composing a message. Other types of filers include geolocation filters (also known as geo-filters) which may be presented to a sending user based on geographic location. For example, geolocation filters specific to a neighborhood or special location may be presented within a user interface by the messaging client application, based on geolocation information determined by a GPS unit of the client device 110. Another type of filer is a data filer, which may be selectively presented to a sending user by the messaging client application, based on other inputs 398 or information gathered by the client device 110 during the message creation process. Examples of data filters include current temperature at a specific location, a current speed at which a sending user is traveling, battery life for a client device 110 or the current time.

Other annotation data that may be stored within the image table is so-called "lens" data. A "lens" may be a real-time special effect and sound that may be added to an image or a video.

As mentioned above, the video table stores video data which, in one embodiment, is associated with messages for which records are maintained within the message table. Similarly, the image table stores image data associated with messages for which message data is stored in the entity table. The entity table may associate various annotations from the annotation table with various images and videos stored in the image table and the video table.

A content collection table stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table). A user may create a "personal story" or content collection in the form of a collection of content that has been created and sent/broadcast by that user. To this end, the user interface of the messaging client application may include an icon that is user selectable to enable a sending user to add specific content to his or her personal story.

A collection may also constitute a "live story," which is a collection of content from multiple users that is created manually, automatically or using a combination of manual and automatic techniques. For example, such a live content collection may constitute a curated set of user-submitted content from various locations and events. Users, whose client devices 110 have location services enabled and are at a common location event at a particular time may, for example, be presented with an option, via a user interface of the messaging client application, to contribute content to a particular live story. The live story may be identified to the user by the messaging client application 104, based on his or her location. The end result is a "live story" told from a community perspective.

A further type of content collection is known as a "location story", which enables a user whose client device 110 is located within a specific geographic location (e.g., on a college or university campus) to contribute to a particular collection. In some embodiments, a contribution to a location story may use a second degree of authentication to verify that the end user belongs to a specific organization or other entity (e.g., is a student on the university campus). In various other embodiments, other types of content collections may be identified and structured within a database using system operator curation tools or automatic computer based analysis, as described herein.

Figure 5:
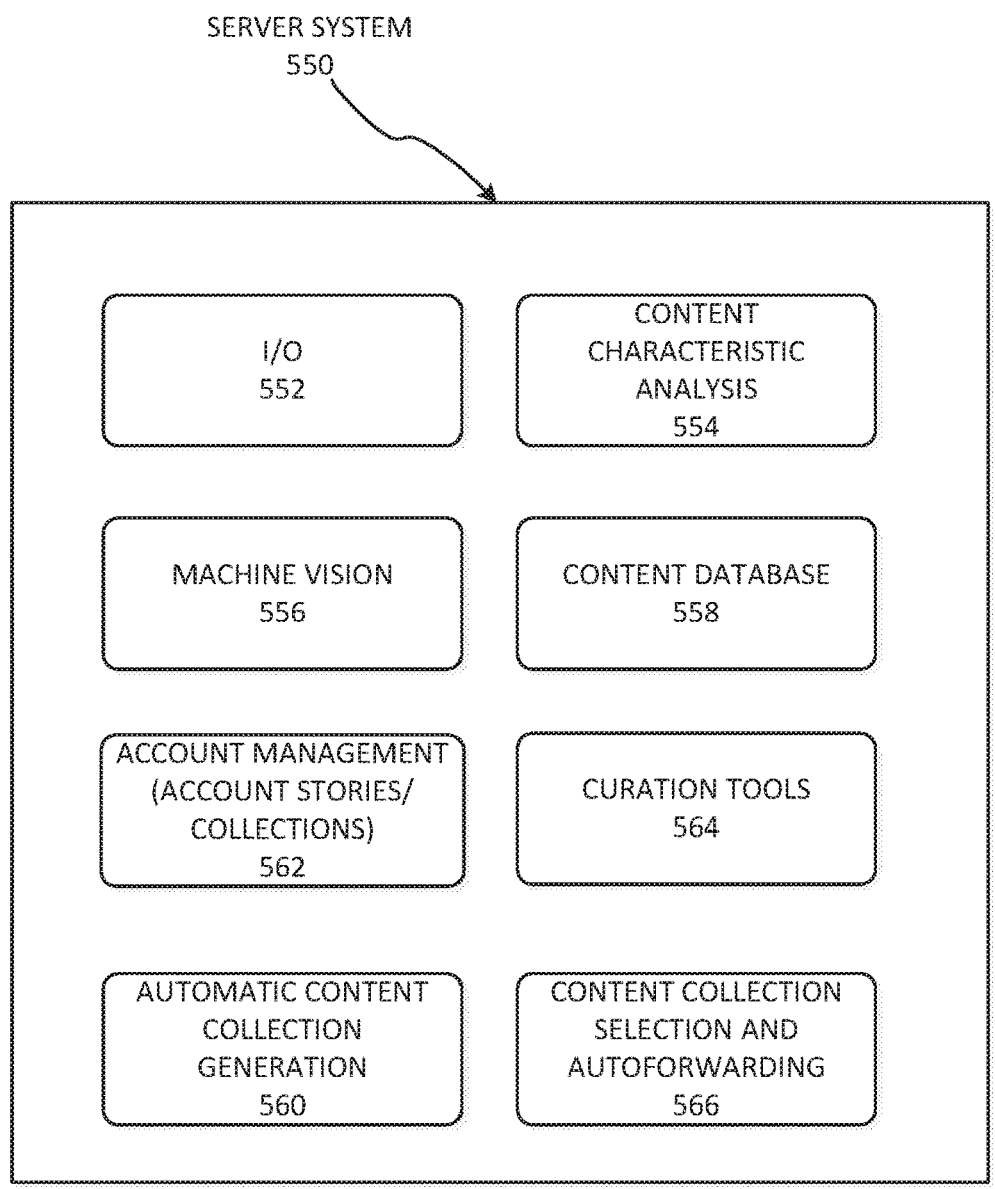
FIG. 5 illustrates aspects of a server system for communication of content messages, generation of content collections, and selection of content collections for autoforwarding, according to some example embodiments.

FIG. 5 illustrates aspects of a server system 550 for automated local content collection generation and curation, according to some example embodiments. In various embodiments, server system 550 may be used as an implementation of server system 150 or server system 250. The example server system 550 includes input and output (I/O) module 552, content characteristic analysis module 554, machine vision module 556, content database 558, account management module 562, automatic content collection module 560, and curation tools 564.

I/O module 552 may include any hardware, firmware, or software elements needed to send and receive content and content collections to client devices 110, 120 via a network 140. Content characteristic analysis module 554 may include devices, processors, and software to analyze images from pictures and frames of video clips, and then determine content characteristics, including details about when and where a picture or video was generated. In certain embodiments, content characteristic analysis module 554 may be implemented as a plurality of different modules, each analyzing a different content characteristic, including any content characteristic described herein.

Machine vision module 556 describes a particular module that may be used to identify content characteristics based on the content of an image or images in a video. Machine vision module 556 includes hardware, firmware, and/or software for analyzing and understanding content. In one embodiment, machine vision module 556 is associated with a dictionary comprising image and video content values. Objects identified in images of a piece of content and the arrangement of the identified objects therein may be used by machine vision module 556, in such an embodiment, to select one or more content values from the dictionary as content characteristics. For example, a simple such machine vision module 556 may identify a ball in an image, and select the values ball and game as content characteristics. A more complex module may identify the type of ball as a basketball, and include "basketball" as a characteristic value. A still more complex machine vision module 556 may identify a basketball, a crowd, a court color, and an elevated perspective of the court to identify "professional basketball game" and "basketball arena" as content values for the content. The same complex machine vision module 556 may identify a basketball, a park background, and a concrete court surface and associate "amateur basketball game" and "playground basketball" as content values for the content.

These content values generated by machine vision module 556 can then be stored in content database 558 along with other characteristic values. Such characteristic values can include: one or more content values (i.e., an identification of what's in the content); a generation time; a generation time period; a generation location; a generation area; one or more quality values, any metadata value associated with content, an identifier for a particular piece of content, or any other such values. In some embodiments, a copy of content may be stored in content database 558 with location information, capture time information, and any other such information about a piece of content. In certain embodiments, content database 558 may anonymously store details about content use. For example, client devices 110, 120 can communicate details about presentation of the content on a screen of the device, and about screenshots taken of the content. Anonymous metrics about how often a piece of content is viewed as part of a content collection, how long the content is viewed for, and how frequently screenshots are taken may then be measured by server system 550, as part of analysis by content characteristic analysis module 554, with the resulting data stored in content database 558. In some embodiments, content database 558 may include this content information with any content or content message information discussed above with respect to FIG. 4 or in any database or table structure discussed above.

Account management module 562 includes application or interface functionality to enable users to manage entity/account relationships via communications between user devices and server system 550. Account management module 562 may also manage an individual user's content collections as described herein.

Curation tools 564 include tools available to system operators or advertisers to generate and present content collections from large amounts of content received at server system 550 and made available by user selection to be included in public content collections (e.g. live content collections, location content collections, content based content collections, etcetera.) Similarly, automatic content collection generation module 560 may filter through large numbers of received pieces of content to generate content collections grouped by location, time, topic, or on any other such basis. In some embodiments, elements of automatic content collection generation module 560 are used to filter the number of pieces of content provided to curation tools 564 to a smaller number (e.g. filtering 10000 received pieces of content to provide 500 pieces of content to curation tools 564 for review by system operators.)

In some embodiments, automatic content collection generation module 560 may then use information about pieces of content from content database 558 to select particular pictures or videos for an automatically generated content collection. In various embodiments, automatic content collection generation module 560 may use complex scoring, weighting, and other rules in generating a content collection. For example, certain embodiments may function such that that all pieces of content meet a quality threshold unless a trend having certain threshold characteristics is identified and all content associated with the trend are below the quality threshold. Another embodiment may weight content collection generation based on a number of content collections currently available in a local geographic area 204, 206. In still further embodiments, any number of complex rules may be applied together as part of content collection generation to filter images and videos for a content collection based on time, location, content, and quality.

Content collection selection and autoforwarding module 566 is used to select one or more next content collections to be sent to a client device 110 following selection of an initial content collection for display on the device and after an autoforward message requesting input or selection of a next content collection is received. In some embodiments, initial sets of content collections are cached on a client device 110, and module 560 only interacts with a device after the locally cached content collections are presented. In other embodiments, different sets of rules are applied to different sets of content collections. For example, content collection selection and autoforwarding module 566 may apply a most recent update order to selecting a next entity relationship content collections, and a user based interest scoring to a selection order for all other content collections. In other embodiments, other sets of selection rules are applied to determine which content collection will be selected as an automatically displayed (e.g. autoforwarded) next content collection for a device. Content collection selection and autoforwarding module 566, in some embodiments, also manages communication of elements to be displayed between content collections, including advertising elements or end-of-collection graphics.

In some embodiments, quality scoring within automatic content collection generation module 560 and/or content collection selection and autoforwarding module 566 may be used to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such matters. For video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio based information may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g. taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g. landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning is used, in certain embodiments, to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g. balanced or weighted scoring for pieces of content within a content collection) are used to sort and select content collections for presentation to a user.

Figure 6:
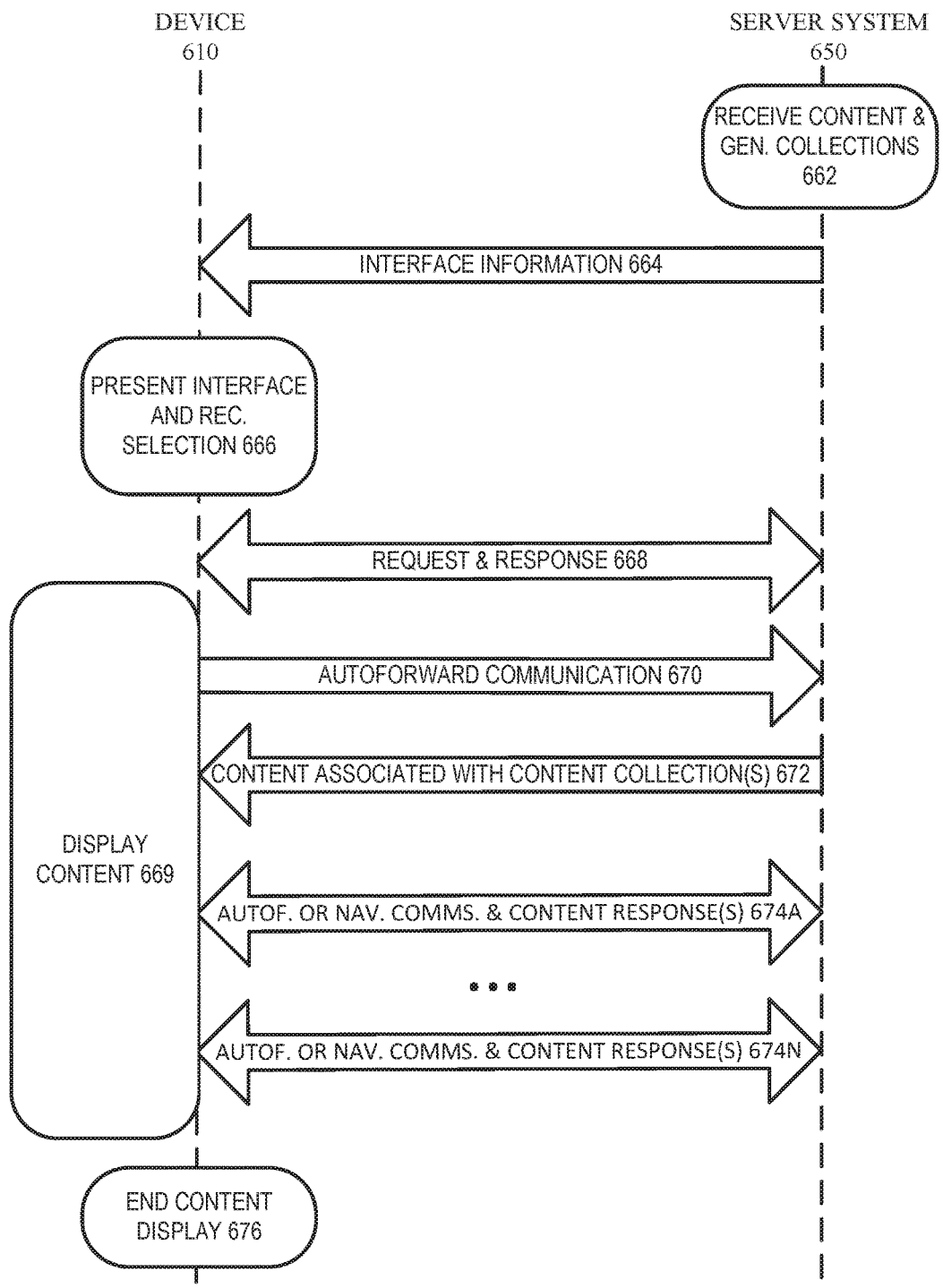
FIG. 6 illustrates aspects of a communication system including a device communicating with a server system for communication of content messages, generation of content collections, and selection of content collections for autoforwarding, according to some example embodiments.

FIG. 6 then illustrates aspects of one embodiment of system operation for autoforwarding presentation of content collections as part of communications between a user device 610 and a server system 650. In the example embodiment of FIG. 6, server system 650 receives and stores content in operation 662. As discussed above, this content is received from a variety of different devices. Server system 650 processes the content to generate content collections. Based on various factors discussed above, such as entity or account relationships, location, system use history, or other factors which may be used in different embodiments, server system 650 selects certain content collections to be made available to a user of device 610 (e.g. via an interface such as that shown in FIG. 3A.) Interface information, which may include details of collection updates and image frames of content from a collection, are sent to device 610 in operation 664. Device 610 then presents an interface including interface information from operation 664, and receives a user's selection of a content collection in operation 666. In the example of FIG. 6, the device 610 sends a resulting request for the selected content (e.g. a story request) and receives the content in response. In various other embodiments, some or all content of one or more content collections may be cached at device 610. In the embodiment of FIG. 6, the server system 650 sends content of the selected collection in response to the user selection of operation 666 and as a response to the story request in operation 668.

Device 610 then begins displaying content of the content collection in operation 669. When display of a first content collection is complete or expected (e.g. within a threshold time of the end of a final piece of content or based on some other content collection ending trigger), device 610 sends an autoforward communication to server system 650 requesting additional content in operation 670, and receives content from a next content collection in operation 672. In embodiments with caching, the initial autoforward communication may occur based on a trigger associated with an end of the cached content. Operations 674A-N then proceed with the device 610 requesting additional content based on either autoforward operation or user navigation inputs. For example, if a user is near the end of a content collection, and inputs a "next content collection" command (e.g. input 393), a request is sent, in some embodiments, from device 610 to server system 650 and content for a next content collection is sent in return. This proceeds with the content displayed in continuing display content operation 669 until an input is received at device 610 to end content display as part of operation 676.

Figure 7:
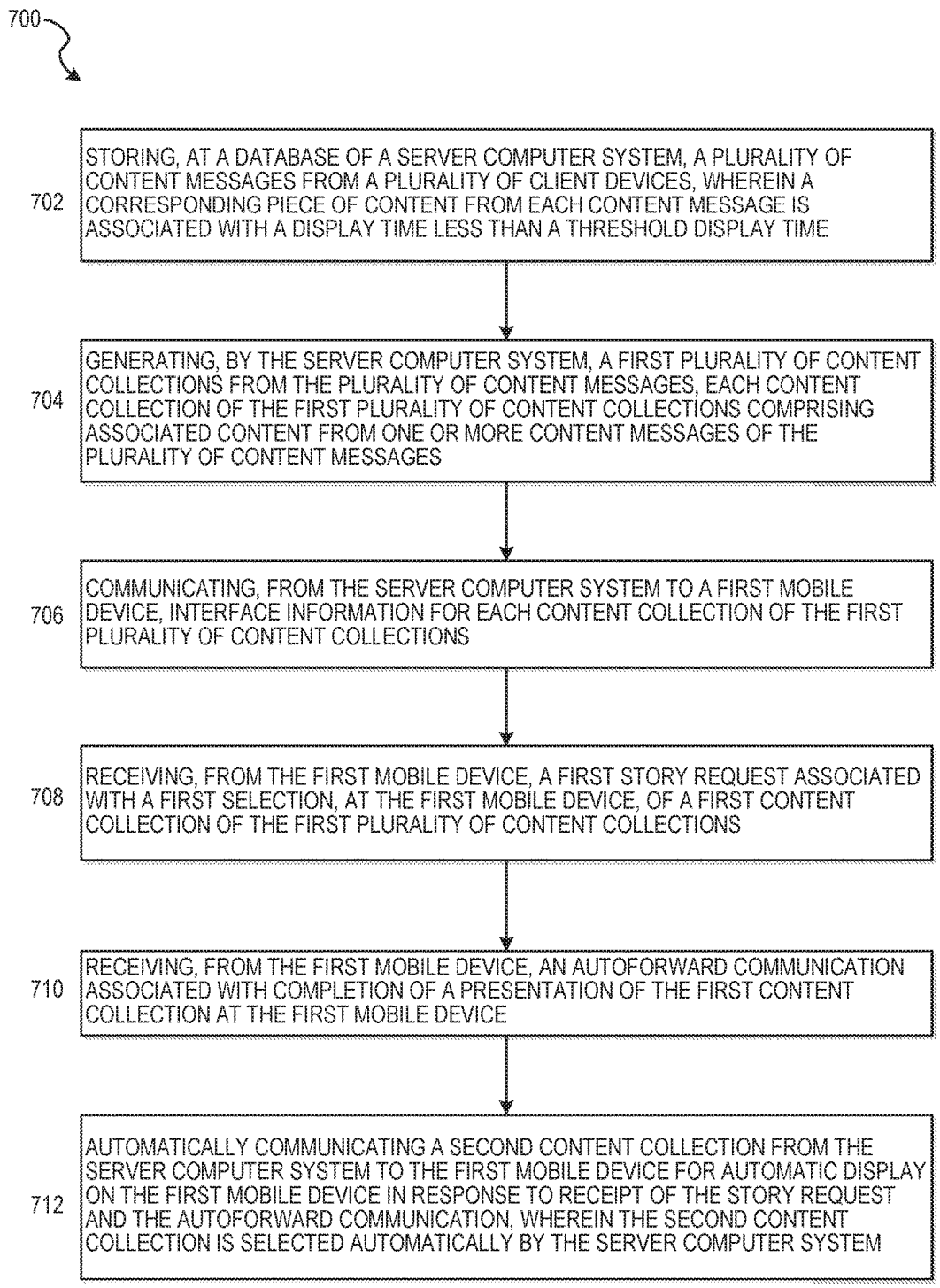
FIG. 7 illustrates a method in accordance with some example embodiments.

FIG. 7 then illustrates a method 700, according to some embodiments, for content collection curation and autoforward operation. In some embodiments, method 700 may be performed by a server computer system or server system 250 such as server systems 150, 250. In other embodiments, method 700 may be implemented as computer readable instructions that, when executed by processors of a computer, cause the computer to perform method 700. Various embodiments may be implemented in any fashion described herein. Additionally, it will be apparent that certain operations may be repeated, reordered, or may have other operations performed between the described operations, while still functioning in accordance with the content collection curation and autoforward embodiments described herein.

Method 700 begins with operation 702 storing, at a database of a server computer system, a plurality of content messages 260, 262 from a plurality of client devices 110, 120, wherein a corresponding piece of content from each content message 260, 262 is associated with a display time less than a threshold display time. Examples of threshold display times are 10 seconds, 30 seconds, and 60 seconds. Other thresholds may be used in other embodiments. Actual display times for a piece of content (e.g. an image with no fixed presentation time) may be less than the threshold. The actual display time may be set by an originator of the image, or by system operation. For image content, the threshold may be enforced by simply cutting the video clip display time to the threshold maximum, and deleting any data for images that overrun the threshold display time limit.

Operation 704 then involves generating, by the server computer system, a first plurality of content collections from the plurality of content messages 260, 262, each content collection of the first plurality of content collections comprising associated content from one or more content messages 260, 262 of the plurality of content messages 260, 262. In operation 706, the server computer system communications interface sends information for each content collection of the first plurality of content collections to a first mobile device. In operation 708, the server computer receives, from the first mobile device, a first story request associated with a first selection, at the first mobile device, of a first content collection of the first plurality of content collections. In some embodiments, the first story request is simply a notification that content has been selected for display. In some embodiments, the story request is a request to for the server to send content of a story. In some embodiments, the request identifies that previously sent content that is cached at a device is being presented. Operation 710 then involves receiving, from the first mobile device, an autoforward communication associated with completion of a presentation of the first content collection at the first mobile device. The association between the autoforward communication and the completion may be based on actually displaying of the last piece of content in a content collection, or based on a threshold or other indicator that a next content collection is expected for display. Any such threshold or operation to initiate communication of a next content collection may be used for the autoforward communication. Operation 712 then includes automatically communicating a second content collection from the server computer system to the first mobile device for automatic display on the first mobile device in response to receipt of the story request and the autoforward communication, wherein the second content collection is selected automatically by the server computer system.

In various embodiments, operation of a method may continue, with autoforward communications requesting a next content collection for display on the device. In some embodiments, when all content collections associated with interface information provided to a device has been displayed, a device may send a live autoforward communication to the server. This live autoforward communication may simply indicate that current or live content is requested in content collection formation, or may otherwise request that certain operations are taken by the server to select additional content collections beyond those identified in the initial interface information. In some embodiments, the live autoforward communication may indicate that the device is requesting a change from one set of rules for selecting a next content collection to a different set of rules for selecting the next content collection.

Figure 8:
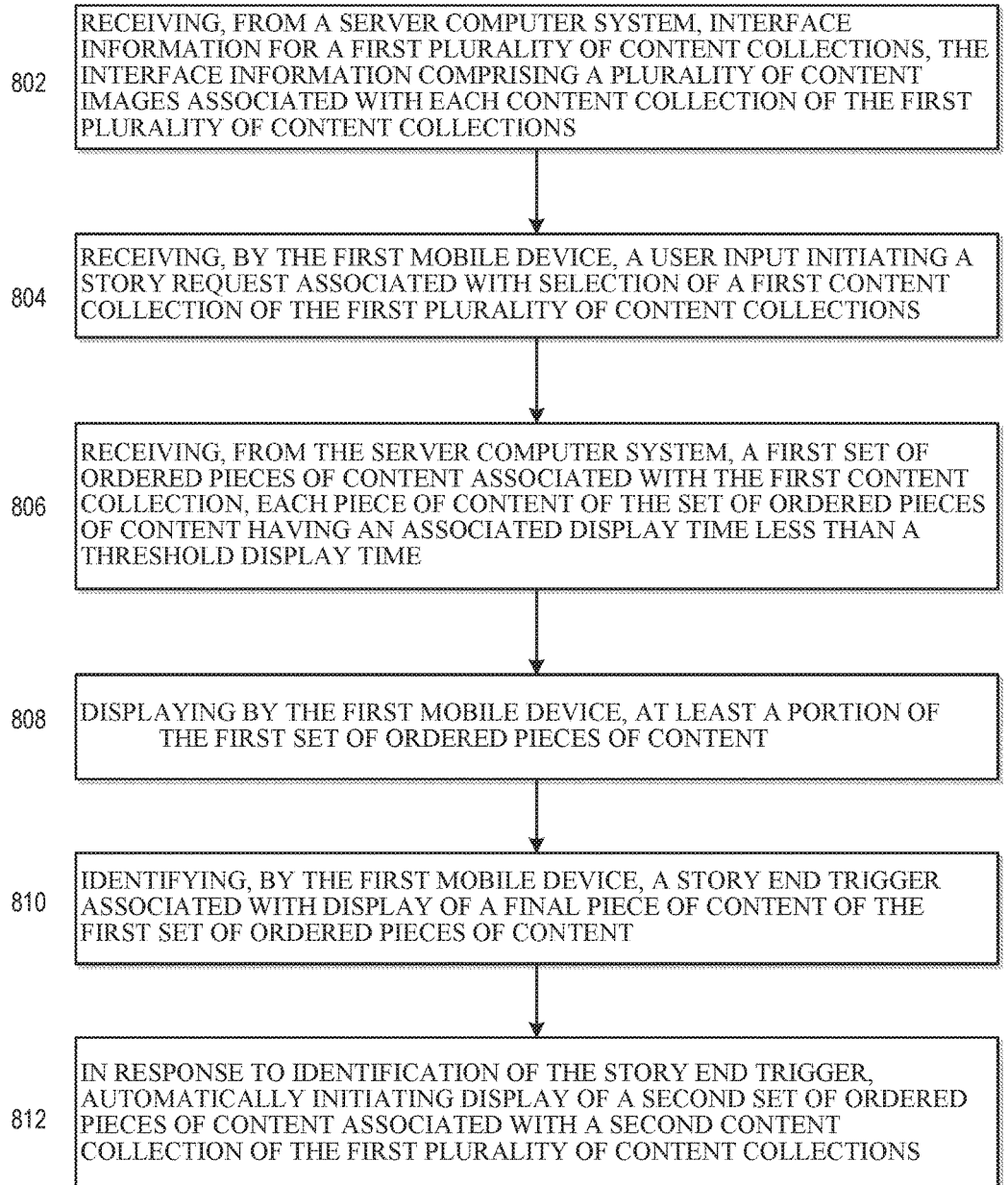
FIG. 8 illustrates a method in accordance with some example embodiments.

Method 800 of FIG. 8 is an example embodiment that may be implemented as operation of a corresponding device in communication with a server computer performing method 700. In other embodiments, methods other than method 800 and method 700 may be performed by devices and server systems 250 to implement curation and autoforwarding as described herein. Operations of method 800 may be implemented, in different embodiments, in any fashion described for similar operations discussed herein.

Method 800 begins with operation 802 receiving, from a server computer system, interface information for a first plurality of content collections, the interface information comprising a plurality of content images associated with each content collection of the first plurality of content collections. Operation 804 then involves receiving, by the first mobile device, a user input initiating a story request associated with selection of a first content collection of the first plurality of content collections and operation 806 continues with receiving, from the server computer system, a first set of ordered pieces of content associated with the first content collection, each piece of content of the set of ordered pieces of content having an associated display time less than a threshold display time.

The first mobile device then displays at least a portion of the first set of ordered pieces of content in operation 808. A story end trigger associated with display of a final piece of content of the first set of ordered pieces of content is identified following operation 808 in operation 810, and in response to identification of the story end trigger, the device automatically initiating display of a second set of ordered pieces of content associated with a second content collection of the first plurality of content collections in operation 812. In various embodiments, the story end trigger may be an actual ending of display of a final piece of content from a content collection. In other embodiments, this may be a trigger based on an expected time to retrieve content from a server prior to the end of display of a final piece of content for a content collection. In some embodiments, this may be a trigger indicating a request to cache content for a next content collection. In still further embodiments, other triggers may be used to request selection and or transmission of a next content collection to be presented automatically at the device. Additionally, as described herein, in various embodiments, multimedia advertising elements (e.g. images, video, graphics, etcetera) may be provided to a device for display between any or all content collections. Different advertising thresholds may be used, such as a time since last advertising element presented, an advertising to content ratio, or any other such threshold.

Figure 9:
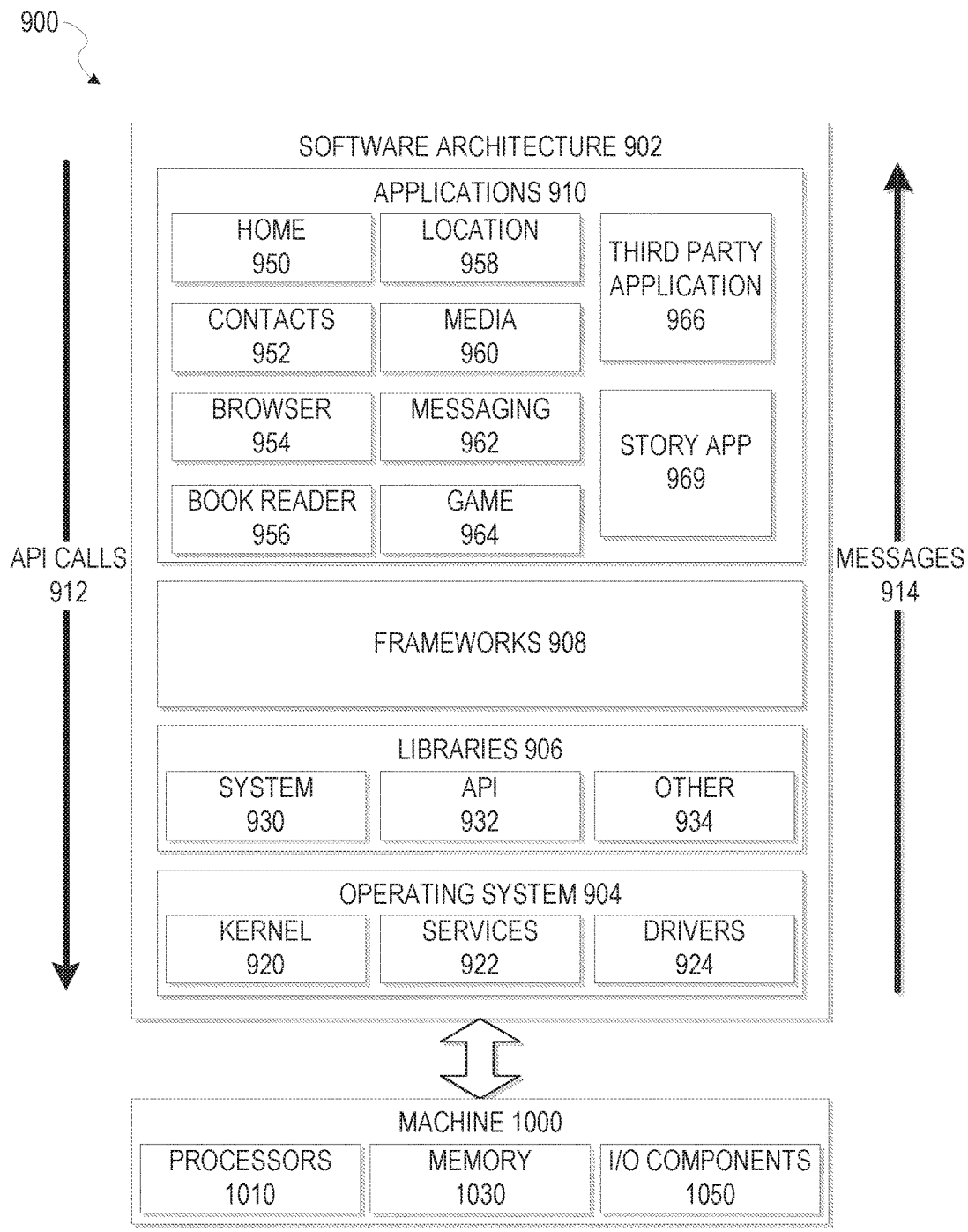
FIG. 9 is a block diagram illustrating an example of a software architecture that may be installed on a machine, according to some example embodiments.

FIG. 9 is a block diagram 900 illustrating architecture of software 902, which can be installed on any one or more of the devices described above. For example, in various embodiments, client devices 110 and 120 and server systems 150, 250, and 550 may be implemented using some or all of the elements of software 902. FIG. 9 is merely a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a content collection application 967. In certain embodiments, this may be a stand-alone application that operates to manage communications with a server system such as server system 150. In other embodiments, this functionality may be integrated with another application such as a media application 960 or another such application. Content collection application 967 may manage collection of content using a camera device of machine 1000, communication with a server system 550 via I/O components 1050, and receipt and storage of received content collections in memory 1030. Presentation of content and user inputs associated with content may be managed by story application 967 using different frameworks 908, library 906 elements, or operating system 904 elements operating on a machine 1000.

Figure 10:
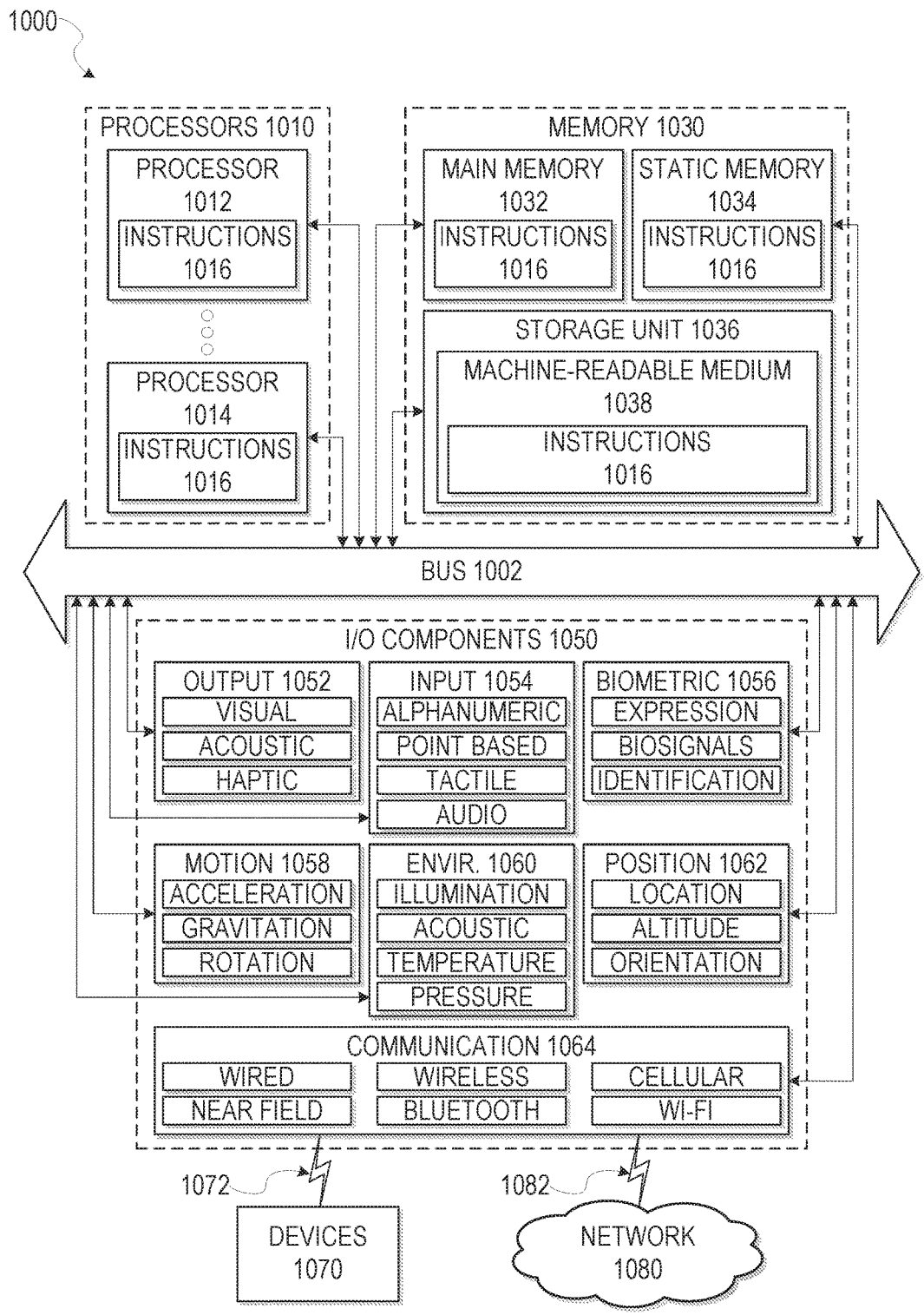
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 710, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine 550 or a client device 110, 120 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 800, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1010, 1012 with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the 1/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for network communication of image based content collections, the method comprising:

storing, at a database of a server computer system, a plurality of content messages from a plurality of client devices, wherein a corresponding piece of content from each content message is associated with a display time less than a threshold display time;

generating, by the server computer system, a first plurality of content collections from the plurality of content messages, each content collection of the first plurality of content collections comprising associated content from one or more content messages of the plurality of content messages;

communicating, from the server computer system to a first mobile device, interface information for each content collection of the first plurality of content collections;

receiving, from the first mobile device, a first story request associated with a first selection, at the first mobile device, of a first content collection of the first plurality of content collections;

receiving, from the first mobile device, an autoforward communication associated with completion of a presentation of the first content collection at the first mobile device; and automatically communicating a second content collection from the server computer system to the first mobile device for automatic display on the first mobile device in response to receipt of the story request and the autoforward communication, wherein the second content collection is selected automatically by the server computer system;

receiving, from the first mobile device, a live autoforward communication associated with completion of an end presentation of a final first content collection of the plurality of content collections at the first mobile device;

automatically communicating a first live content collection from the server computer system to the first mobile device for automatic display on the first mobile device in response to receipt of the live autoforward communication;

receiving, from the first mobile device, a live autoforward communication associated with completion of a presentation of the first live content collection at the first mobile device;

generating, following receipt of the live autoforward communication, a second live content collection; and communicating a second live content collection from the server computer system to the first mobile device for automatic display on the first mobile device in response to receipt of the live autoforward communication;

wherein the first live content collection is generated automatically by:

receiving, at a server computer system, a content message from a first content source of a plurality of content sources, the content message comprising media content;

analyzing, by the server computer system, the content message to determine one or more quality scores and one or more context values associated with the content message;

storing the content message in a database of the server computer system along with the one or more quality scores and the one or more context values, the one or more context values including one or more of a content value, a generation time, a generation time period, a generation location, a generation area, and a quality value;

analyzing, by the server computer system, the content message with a plurality of content collections of the database to identify a match between at least one of the one or more context values and a topic associated with at least a first content collection of the one or more content collections; and automatically adding, by the server computer system, the content message to the first live content collection based, at least in part, on the match;

wherein a first ordering of the first plurality of content collections is based at least in part on context values associated with each content collection of the plurality of content collections; and wherein communicating of the second live content collection from the server computer system to the first mobile device is based on a second ordering determined by the live autoforward communication and one or more context values associated with the second live content communication.

2. The method of claim 1, wherein the first content collection comprises a first set of content from a first set of content messages of the plurality of content messages, wherein the first set of content messages are received from a second mobile device associated with a second user account of the server computer system;

wherein the first user device is associated with a first user account of the server computer system; and wherein the first user device and the second user device are associated with the server computer system.

3. The method of claim 2, wherein the first set of content messages comprises all content messages received at the server computer system from the second mobile device within a story threshold time prior to receipt of the first story request at the server computer system.

4. The method of claim 3, wherein the story threshold time is 24 hours.

5. The method of claim 2, wherein the first content collection is selected by the server computer system for the first plurality of content collections based on the association between the first user account and the second user account.

6. The method of claim 1, wherein the first plurality of content collections comprises content collections from a plurality of friend accounts associated with the first mobile device.

7. The method of claim 1, further comprising communicating one or more advertising elements for presentation on the first mobile device prior to automatic display of the second content collection.

8. The method of claim 1, further comprising communicating one or more advertising elements for presentation on the first mobile device following presentation of a trigger content collection of the first plurality of content collections or the first live content collection, wherein the trigger content collection is selected from content collections of the first plurality of content collections or the first live content collection based on an advertising threshold.

9. The method of claim 1, further comprising:

receiving, at the server computer system, a second plurality of content messages;

receiving, at the server computer system via a curation tool, selection of live media content from the second plurality of content messages for the live content collection; and periodically updating live media content of the live content collection using the curation tool.

10. The method of claim 1, wherein the interface information comprises at least one frame of image data from each piece of content of each content collection of the first plurality of content collections.

11. The method of claim 1, wherein the first plurality of content collections comprises a third live content collection;

wherein the interface information further comprises one or more frames of image data from each piece of content of the third live content collection, wherein each of the one or more frames of image data from each piece of content of the third live content collection are selected using a curation tool.

12. The method of claim 1, wherein the threshold display time comprises a time value less than or equal to ten seconds.

13. A method for communication and presentation of image based content collections at a first mobile device, the method comprising:

receiving, from a server computer system, interface information for a first plurality of content collections, the interface information comprising a plurality of content images associated with each content collection of the first plurality of content collections;

receiving, by the first mobile device, a user input initiating a story request associated with selection of a first content collection of the first plurality of content collections;

receiving, from the server computer system, a first set of ordered pieces of content associated with the first content collection, each piece of content of the set of ordered pieces of content having an associated display time less than a threshold display time;

displaying, by the first mobile device, at least a portion of the first set of ordered pieces of content;

identifying, by the first mobile device, a story end trigger associated with display of a final piece of content of the first set of ordered pieces of content; and in response to identification of the story end trigger, automatically initiating display of a second set of ordered pieces of content associated with a second content collection of the first plurality of content collections;

communicating, to the server computer system, a live autoforward communication associated with completion of an end presentation of a final first content collection of the plurality of content collections at the first mobile device;

receiving a first live content collection from the server computer system for automatic display in response to the live autoforward communication;

communicating a live autoforward communication associated with completion of a presentation of the first live content collection at the first mobile device;

receiving a second live content collection generated by the server computer system following receipt of the live autoforward communication, and automatically displaying, on the first mobile device the second live content collection;

wherein a first ordering of the first plurality of content collections is based at least in part on context values associated with each content collection of the plurality of content collections;

wherein communicating of the second live content collection from the server computer system to the first mobile device is based on a second ordering determined by the live autoforward communication and one or more context values associated with the second live content communication; and wherein context values for each content collection comprise one or more of a content value, a generation time, a generation time period, a generation location, a generation area, and a quality value.

14. The method of claim 13, further comprising:

automatically presenting each content collection of the plurality of content collections in a sequential order, wherein the sequential order is based on a time associated with the most recently received content message for each content collection of the plurality of content collections.

15. The method of claim 14, further comprising:

receiving, at the first mobile device, a first tap input to a touchscreen of the first mobile device;

in response to the first tap input, shifting to a previous piece of media content of a currently displayed content collection;

receiving, at the first mobile device, a first swipe input to the touchscreen of the first mobile device; and in response to the first swipe input, shifting to display of a previous content collection and continuing the sequential display from a beginning of the previous content collection.

16. The method of claim 14, further comprising:

displaying, following an end of each content collection of the plurality of content collections, a standardized media display indicating an end of the content collection before automatically displaying a next content collection in the sequential order; and displaying, following at least a portion of the plurality of content collections prior to the beginning of the next content collection, one or more advertising elements.

17. A non-transitory computer readable medium comprising instructions that, when executed by one or more processors of a first mobile device, cause the first mobile device to perform a method for autoforwarding during display of a plurality of content collections on the first mobile device, the method comprising:

receiving, from a server computer system, interface information for a first plurality of content collections, the interface information comprising a plurality of content images associated with each content collection of the first plurality of content collections;

receiving, by the first mobile device, a user input initiating a story request associated with selection of a first content collection of the first plurality of content collections;

receiving, from the server computer system, a first set of ordered pieces of content associated with the first content collection, each piece of content of the set of ordered pieces of content having an associated display time less than a threshold display time;

displaying, by the first mobile device, at least a portion of the first set of ordered pieces of content identifying, by the first mobile device, a story end trigger associated with display of the first set of ordered pieces of content;

communicating, to the server computer system, an autoforward communication associated with the story end trigger; and in response to identification of the story end trigger, automatically initiating display of a second set of ordered pieces of content associated with a second content collection of the first plurality of content collections;

communicating, to the server computer system, a live autoforward communication associated with completion of an end presentation of a final first content collection of the plurality of content collections at the first mobile device;

receiving a first live content collection from the server computer system for automatic display in response to the live autoforward communication;

communicating a live autoforward communication associated with completion of a presentation of the first live content collection at the first mobile device;

receiving a second live content collection generated by the server computer system following receipt of the live autoforward communication; and automatically displaying, on the first mobile device the second live content collection;

wherein a first ordering of the first plurality of content collections is based at least in part on context values associated with each content collection of the plurality of content collections;

wherein communicating of the second live content collection from the server computer system to the first mobile device is based on a second ordering determined by the live autoforward communication and one or more context values associated with the second live content communication; and wherein context values for each content collection comprise one or more of a content value, a generation time, a generation time period, a generation location, a generation area, and a quality value.

* * * * *